(12) United States Patent
Kirkpatrick

(10) Patent No.: US 9,541,145 B2
(45) Date of Patent: Jan. 10, 2017

(54) KEYED BRAKE DISK ASSEMBLY

(71) Applicant: GOODRICH CORPORATION, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/065,517

(22) Filed: Mar. 9, 2016

(65) Prior Publication Data

US 2016/0186824 A1  Jun. 30, 2016

Related U.S. Application Data

(62) Division of application No. 13/927,963, filed on Jun. 26, 2013, now Pat. No. 9,315,261.

(51) Int. Cl.
| | | |
|---|---|---|
| *F16D 65/12* | (2006.01) | |
| *B64C 25/42* | (2006.01) | |
| *F16D 65/092* | (2006.01) | |
| *F16D 55/36* | (2006.01) | |
| *F16D 65/02* | (2006.01) | |
| *B64C 25/44* | (2006.01) | |
| *F16D 55/00* | (2006.01) | |

(52) U.S. Cl.
CPC .............. *F16D 65/127* (2013.01); *B64C 25/42* (2013.01); *B64C 25/44* (2013.01); *F16D 55/36* (2013.01); *F16D 65/02* (2013.01); *F16D 65/092* (2013.01); *F16D 65/12* (2013.01); *F16D 65/123* (2013.01); *F16D 2055/0058* (2013.01); *F16D 2065/1316* (2013.01); *F16D 2065/1356* (2013.01); *F16D 2065/1372* (2013.01); *F16D 2065/1376* (2013.01); *F16D 2065/1392* (2013.01)

(58) Field of Classification Search
CPC ...... B64C 25/42; F16D 65/092; F16D 65/123; F16D 65/127; F16D 2065/1316; F16D 2065/132; F16D 2065/1356
See application file for complete search history.

(56) References Cited

U.S. PATENT DOCUMENTS

| | | |
|---|---|---|
| 3,425,524 A | 2/1969 | Dewar |
| 3,473,637 A | 10/1969 | Rutt |

(Continued)

FOREIGN PATENT DOCUMENTS

| | | |
|---|---|---|
| EP | 0744560 | 11/1996 |
| EP | 0833071 | 4/1998 |
| EP | 2068032 | 6/2009 |
| GB | 1246158 | 9/1971 |
| GB | 1496341 | 12/1977 |

OTHER PUBLICATIONS

Preinterview First Office Action dated Jul. 13, 2015 in U.S. Appl. No. 14/076,666.

(Continued)

*Primary Examiner* — Vishal Sahni
(74) *Attorney, Agent, or Firm* — Snell & Wilmer, L.L.P.

(57) ABSTRACT

Friction disks, such as rotors and stators, including keyed wear liners are disclosed. The friction disks may include a core and a replaceable wear liner coupled to each side of the core. The wear liners may include a plurality of keys which engage key notches in the core. The key notches may prevent the wear liners from rotating with respect to the core in response to a shear force, such as a force applied during braking.

8 Claims, 6 Drawing Sheets

(56) References Cited

U.S. PATENT DOCUMENTS

| | | | |
|---|---|---|---|
| 3,613,851 A * | 10/1971 | Ely | F16D 65/121 |
| | | | 188/218 XL |
| 3,618,729 A * | 11/1971 | Ely | F16D 13/62 |
| | | | 188/218 XL |
| 3,724,623 A * | 4/1973 | Thrower | F16D 65/121 |
| | | | 188/218 XL |
| 3,747,712 A | 7/1973 | Stout | |
| 3,972,395 A * | 8/1976 | Jannasch | F16D 55/40 |
| | | | 188/218 XL |
| 4,511,021 A * | 4/1985 | Grider | F16D 65/126 |
| | | | 188/218 XL |
| 5,558,186 A | 9/1996 | Hyde et al. | |
| 5,779,006 A | 7/1998 | Hyde et al. | |
| 6,877,207 B1 | 4/2005 | Barnhardt | |
| 7,543,691 B2 | 6/2009 | Hopkins et al. | |
| 7,938,236 B2 | 5/2011 | Johnson | |
| 8,281,907 B2 | 10/2012 | Fryska et al. | |
| 9,315,261 B2 * | 4/2016 | Kirkpatrick | B64C 25/44 |
| 2007/0175710 A1 * | 8/2007 | Walker | F16D 65/0043 |
| | | | 188/71.5 |
| 2010/0000070 A1 | 1/2010 | Forest et al. | |
| 2013/0112514 A1 * | 5/2013 | Hanna | F16D 65/12 |
| | | | 188/218 XL |
| 2015/0001017 A1 * | 1/2015 | Kirkpatrick | F16D 65/12 |
| | | | 188/218 XL |
| 2015/0129369 A1 * | 5/2015 | Kirkpatrick | F16D 65/12 |
| | | | 188/71.5 |

OTHER PUBLICATIONS

European Search Report dated May 7, 2015 in European Application No. 14192562.8.
Extended European Search Report dated Nov. 10, 2015 in European Application No. 14166233.8.
Non Final Office Action dated Jun. 15, 2015, U.S. Appl. No. 13/927,963.
Final Office Action dated Sep. 16, 2015, U.S. Appl. No. 13/927,963.
Notice of Allowance dated Dec. 10, 2015, U.S. Appl. No. 13/297,963.

* cited by examiner

KEYED BRAKE DISK ASSEMBLY

CROSS-REFERENCE TO RELATED APPLICATIONS

This application is a divisional of, and claims priority to, and the benefit of U.S. Ser. No. 13/927,963 filed Jun. 26, 2013, and entitled "KEYED BRAKE DISK ASSEMBLY" which is incorporated by reference herein in its entirety.

FIELD

The present invention relates to aircraft braking systems. In particular, the invention relates to a brake disk assembly of an aircraft braking system.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. During high speed landings and rejected takeoffs ("RTOs"), the amount of heat generated can be enough to destroy friction disks made of formerly commonly used materials, such as steel. Carbon composite materials are better suited for high temperature use and are now the standard for friction disks in aircraft brake assemblies. However, carbon composite disks can be expensive to manufacture, especially ones having the thickness preferable for use on an aircraft. Replaceable wear liners may be bonded to a core in order to decrease costs. However, such liners may delaminate from the core due to the high shear force during braking in combination with high braking temperatures.

SUMMARY

According to various embodiments, a stator is disclosed. The stator may comprise a core and a wear liner. The core may comprise a spine and an inner core having a thickness greater than the spine. The inner core may further comprise a key notch recessed into an outer portion of the inner core. The wear liner may be coupled to the spine. The first wear liner may comprise an annular ring and a stator key. The stator key may mate with the key notch in the inner core. The stator key may engage a core key in the inner core to prevent rotation of the first wear liner.

According to various embodiments, a rotor is disclosed. The rotor may comprise a core and a wear liner. The core may comprise a spine and a plurality of lugs. At least one lug may comprise a recessed key notch. The wear liner may comprise an annular ring having a wear surface and a mating surface. The mating surface may be disposed adjacent to the spine. The wear surface may also comprise a rotor key. The rotor key may be disposed within the recessed key notch. The rotor key may contact the at least one lug to oppose a shear force applied to the wear liner.

According to various embodiments, a friction disk is disclosed. The friction disk may comprise a core and a wear liner. The core may comprise a spine and a plurality of lugs. The plurality of lugs may have a plurality of notches recessed therein. The wear liner may comprise a wear surface, a mating surface, and a plurality of keys located adjacent to at least one of an inner surface and an outer surface of the wear liner, wherein the plurality of keys are located within the plurality of notches.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Friction disks, including rotors and stators, including keyed wear liners are disclosed. The friction disks may include a core and a replaceable wear liner coupled to each side of the core. The wear liners may include a plurality of keys which engage key notches in the core. The key notches may prevent the wear liners from rotating with respect to the core in response to a shear force, such as a force applied during braking.

Figure 1:
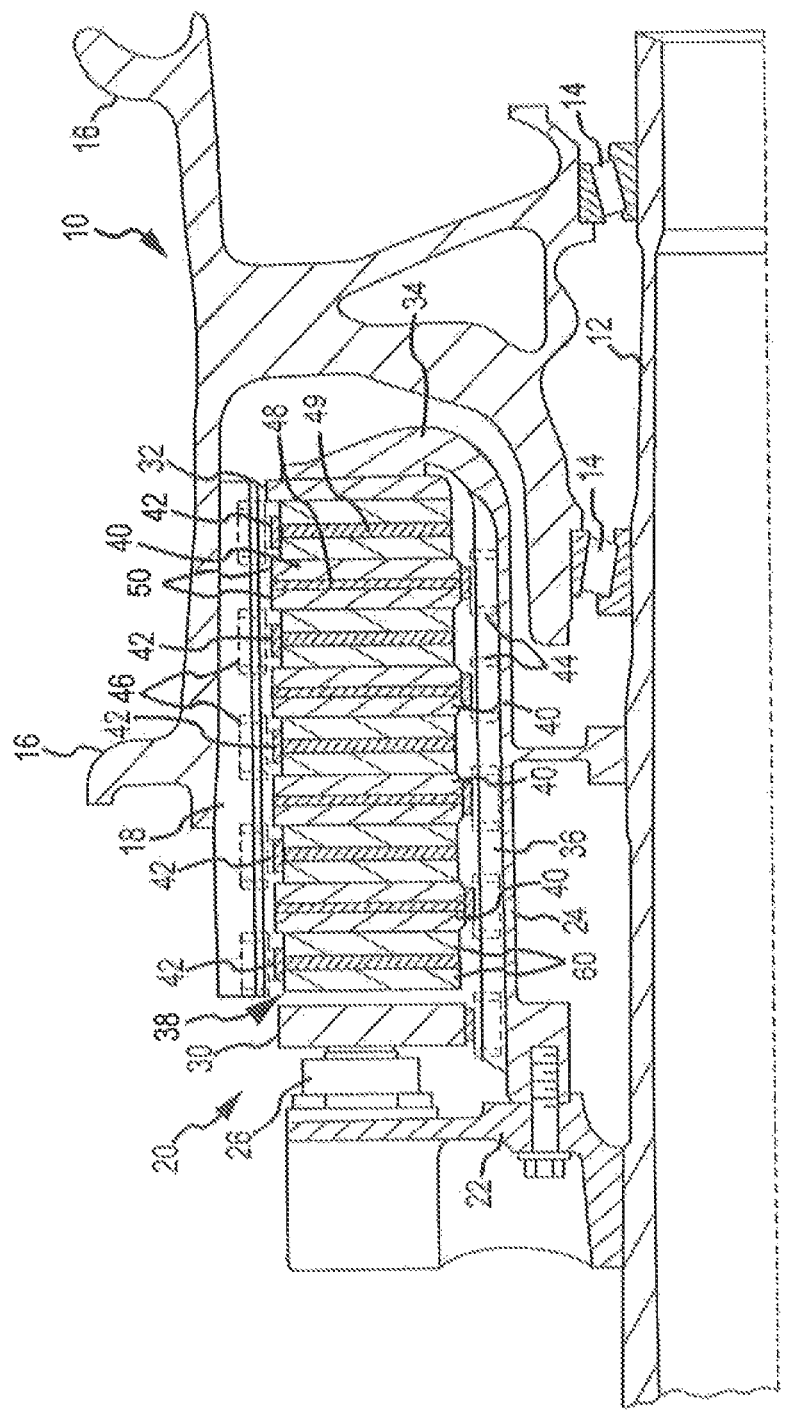
FIG. 1 illustrates, in accordance with various embodiments, multi-disk brake.

Referring to FIG. 1, a multi-disk brake system 20 is illustrated according to various embodiments. The system may include a wheel 10 supported for rotation around axle 12 by bearings 14. Wheel 10 includes rims 16 for supporting a tire (not shown), and a series of axially extending rotor splines 18 (one shown). Rotation of wheel 10 is modulated by disk brake system 20. Disk brake system 20 includes torque flange 22, torque tube 24, a plurality of pistons 26 (one shown), pressure carbon disk 30, and end plate 32. Torque tube 24 is an elongated annular structure that includes reaction plate 34, and a series of axially extending stator splines 36 (one shown). Reaction plate 34 and stator splines 36 may be integral with torque tube 24 as shown in FIG. 1, or attached as separate components.

Disk brake system 20 also includes a plurality of friction disks 38. The plurality of friction disks 38 includes at least one non-rotatable friction disk 40, also known as a stator, and at least one rotatable friction disk 42, also known as a rotor. Non-rotatable friction disks 40 may comprise a stator core 48 and stator wear liners 50. Rotatable friction disks 42 may comprise a rotor core 49 and rotor wear liners 60. Each friction disk 38 includes an attachment structure. In the embodiment of FIG. 1, each of four non-rotatable friction disks 40 include a plurality of stator lugs 44 at circumferentially spaced positions around non-rotatable friction disk 40 as an attachment structure. Similarly, each of five rotatable friction disks 42 include a plurality of rotor lugs 46 at circumferentially spaced positions around rotatable friction disk 42 as an attachment structure. In the embodiment of FIG. 1, pressure carbon disk 30, end plate 32, and friction disks 38 are all annular structures made at least partially from a carbon composite material.

Torque flange 22 is mounted to axle 12. Torque tube 24 is bolted to torque flange 22 such that reaction plate 34 is near an axial center of wheel 10. End plate 32 is connected to a surface of reaction plate 34 facing axially away from the axial center of wheel 10. Thus, end plate 32 is non-rotatable by virtue of its connection to torque tube 24. Stator splines 36 support pressure carbon disk 30 so that pressure carbon disk 30 is also non-rotatable. Stator splines 36 also support non-rotatable friction disks 40. Non-rotatable friction disks 40 engage stator splines 36 with gaps formed between stator lugs 44. Similarly, rotatable friction disks 42 engage rotor splines 18 with gaps formed between rotor lugs 46. Thus, rotatable friction disks 42 are rotatable by virtue of their engagement with rotor splines 18 of wheel 10.

As shown in FIG. 1, rotatable friction disks 42 are arranged with end plate 32 on one end, pressure carbon disk 30 on the other end, and non-rotatable friction disks 40 interleaved so that rotatable friction disks 42 are adjacent to non-rotatable friction components. Pistons 26 are connected to torque flange 22 at circumferentially spaced positions around torque flange 22. Pistons 26 face axially toward wheel 10 and contact a side of pressure carbon disk 30 opposite rotatable friction disks 42. Pistons 26 may be powered electrically, hydraulically, or pneumatically.

Figure 2:
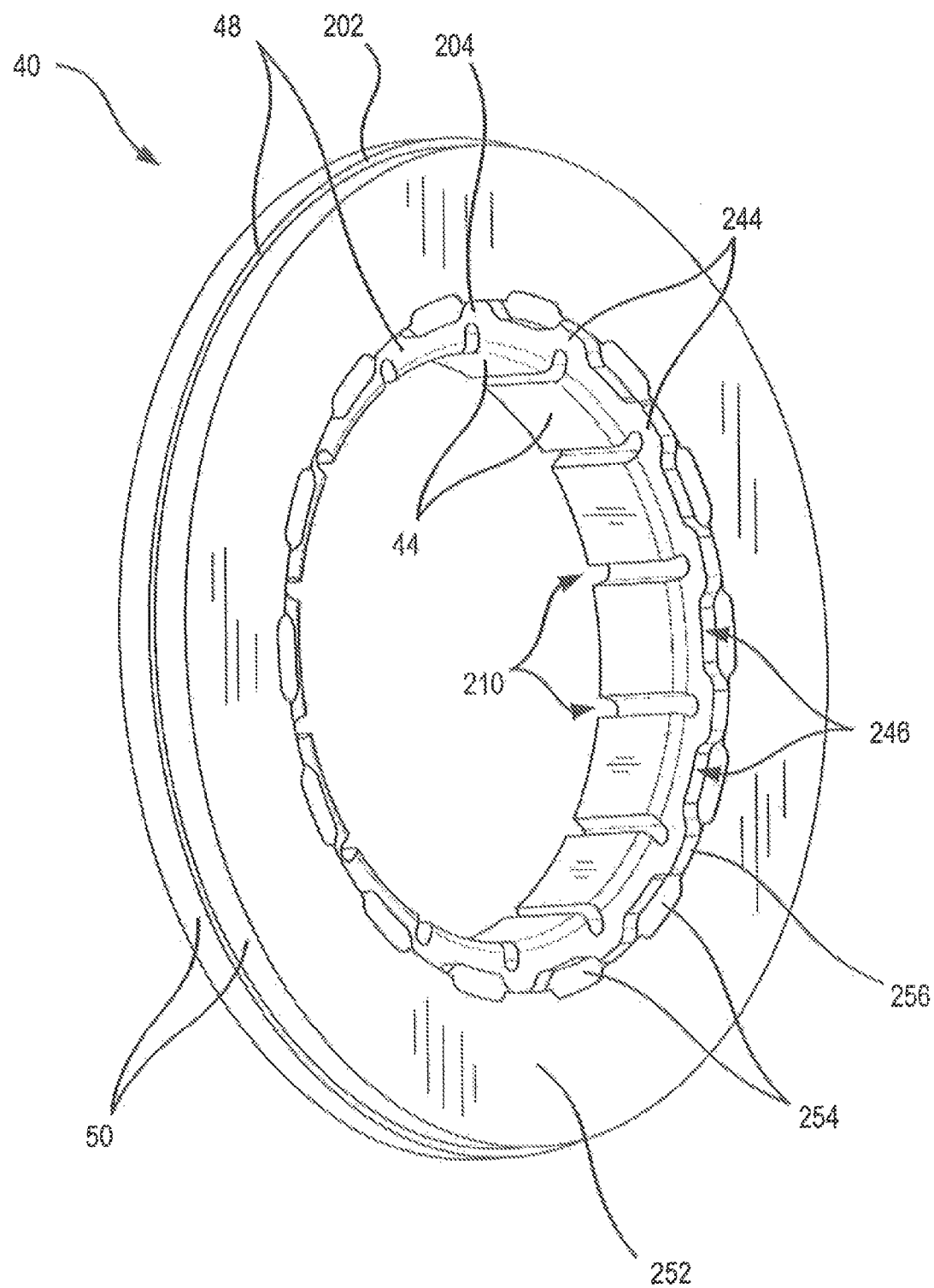
FIG. 2 illustrates, in accordance with various embodiments, a perspective view of a stator having a keyed wear liner.

Referring to FIG. 2, a stator 40 is illustrated according to various embodiments. Stator 40 may comprise a stator core 48, and stator wear liners 50. Stator core 48 and stator wear liners 50 may comprise different materials. For example, in various embodiments, stator core 48 may comprise steel, and stator wear liners 50 may comprise a carbon composite. However, in various embodiments, stator core 48 and stator wear liners 50 may comprise the same material, such as a carbon composite. In various embodiments, the material of stator core 48 may be selected for its structural properties. For example, stator core 48 may comprise silicon carbide or titanium. A material of stator wear liners 50 may be selected for its frictional properties. In various embodiments, the material of stator wear liners 50 may be selected for its wear resistance, thermal conductivity, heat capacity, structural, and/or oxidation resistance properties. Thus, stator 40 may contain the structural advantages of stator core 48, and the frictional advantages of stator wear liners 50.

Stator core 48 may comprise spine 202 and inner core 204. Inner core 204 may comprise stator lugs 44. Inner core 204 may further comprise gaps 210 between an inner portion of stator lugs 44. Gaps 210 may be located to align with stator splines 36. The engagement between the stator splines 36 and stator lugs 44 prevents stator 40 from rotating when a torque is applied to stator 40 during braking. Stator core 48 may further comprise core keys 244 and core key notches 246 located at an outer portion of stator lugs 44. In various embodiments, core keys 244 may extend radially from an outer portion of inner core 204. In various embodiments, core keys 244 may comprise teeth. Core key notches 246 may be a recess between core keys 244, and/or a recess in an outer portion of inner core 204.

Stator wear liners 50 may be located adjacent to stator core 48. As illustrated, stator wear liners 50 may be located adjacent to opposite sides of spine 202. In various embodiments, stator wear liners 50 may be coupled to stator core 48. Stator wear liners 50 may be coupled to stator core 48 by, for example, a bond or by mechanical fastening such as riveting. In various embodiments, a bond may comprise an adhesive capable of maintaining adhesion under high temperatures, for example, between about 800° F. (about 426° C.) and 2000° F. (about 1093° C.). In addition, in various embodiments, an adhesive may be applied via chemical vapor deposition. In various embodiments, stator wear liners 50 are not fastened to stator core 48, and stator wear liners 50 are kept in place by contact from adjacent components, such as rotor wear liners 60. In various embodiments, stator wear liners 50 may be replaceable wear liners, such that after stator wear liners 50 have been worn below a suitable operation thickness, stator wear liners 50 may be detached from stator core 48 and replaced by new or remanufactured wear liners. In various embodiments, used stator wear liners may be bonded together to form a remanufactured stator wear liner. Stator wear liners 50 may comprise stator annular ring 252 and stator keys 254. In various embodiments, stator wear liners 50 may comprise a substantially uniform thickness. However, in various embodiments, stator keys 254 may have a thickness which is greater than or less than a thickness of stator annular ring 252. Stator keys 254 may be separated by stator wear liner key notches 256. In various embodiments, stator annular ring 252 and stator keys 254 may be a single continuous component. However, in various embodiments stator keys 254 may be coupled to stator annular ring 252. In various embodiments, stator keys 254 may be sized and shaped to mate with core key notches 246. In various embodiments, core keys 244 may be sized and shaped to mate with wear liner key notches 256.

During aircraft braking, a torque may be applied to stator wear liners 50. The torque may cause a shear force that, in the absence of a counteracting force, acts to rotate stator wear liners 50 relative to stator core 48. However, core keys 244 may slide into wear liner key notches 256 to engage stator keys 254. Contact between core keys 244 and stator keys 254 may counteract the torque, thus reducing the shear force, and may prevent stator wear liners 50 from rotating relative to stator core 48. In various embodiments, whether by design or due to manufacturing tolerances, small gaps may exist between core keys 244 and wear liner key notches 256, resulting in stator wear liners 50 rotating slightly relative to stator core 48 prior to core keys 244 engaging stator keys 254. In various embodiments, although core keys 244 may prevent rotation of stator wear liners 50, due to elastic material properties of stator wear liners 50, stator wear liners 50 may stretch in the direction of the torque at an outside diameter of stator wear liners 50 due to the shear force.

Figure 3:
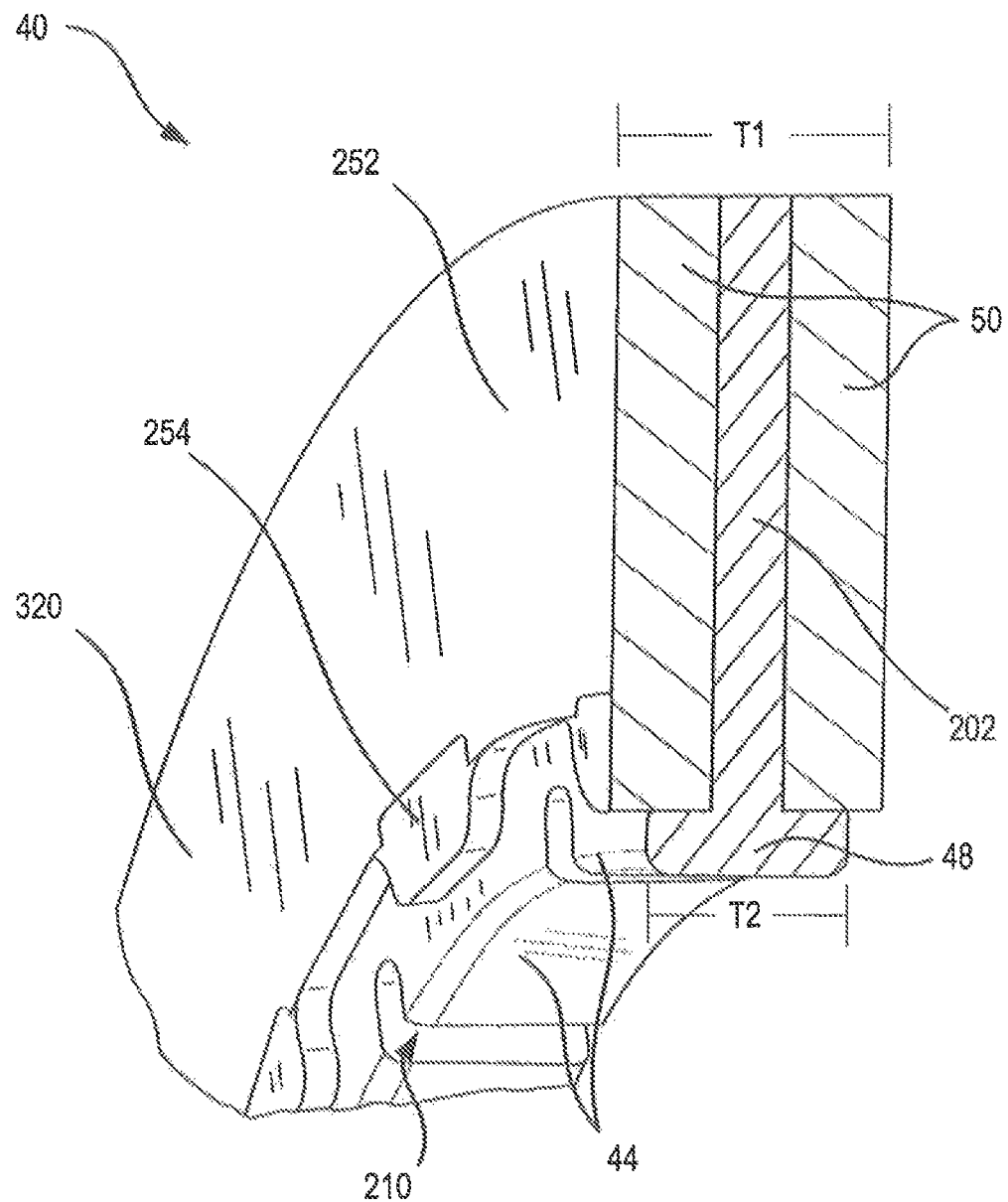
FIG. 3 illustrates, in accordance with various embodiments, a cutaway view of a stator having a keyed wear liner.

Referring to FIG. 3, a cutaway view of stator 40 is illustrated according to various embodiments. Stator 40 may comprise stator core 48, stator lugs 44, gaps 210, stator wear liners 50, stator annular ring 252, and stator keys 254. As illustrated in FIG. 3, a cross-section of core spine 202 may be substantially rectangular such that stator wear liners 50 are substantially parallel. However, in various embodiments, a cross section of core spine 202 may be triangular, such that stator wear liners 50 are non-parallel and in a Belleville configuration. In a Belleville configuration, stator wear liners 50 may comprise a coned disc shape such that a distance between stator wear liners 50 decreases as the radius increases.

In various embodiments, stator wear surface 320 may begin at a greater radius than stator keys 254. Thus, stator keys 254 may not be part of stator wear surface 320, and stator keys 254 may not be worn down by contact with rotors 42. In various embodiments, a combined thickness T1 of stator wear liners 50 and core spine 202 in the axial direction is greater than a thickness T2 of stator lugs 44 in the axial direction, such that stator wear liners 50 extend beyond stator lugs 44. Thus, both stator annular ring 252 and stator keys 254 may be a part of a stator wear surface 320 which contacts rotor 42, without rotor 42 contacting stator core 48. The lifetime of stator core 48 may be increased, because in various embodiments, stator core 48 is not worn down by contact with rotor 42. However, in various embodiments, the thickness of stator lugs 44 may be greater than the combined thickness of stator wear liners 50 and core spine 202.

Figure 4:
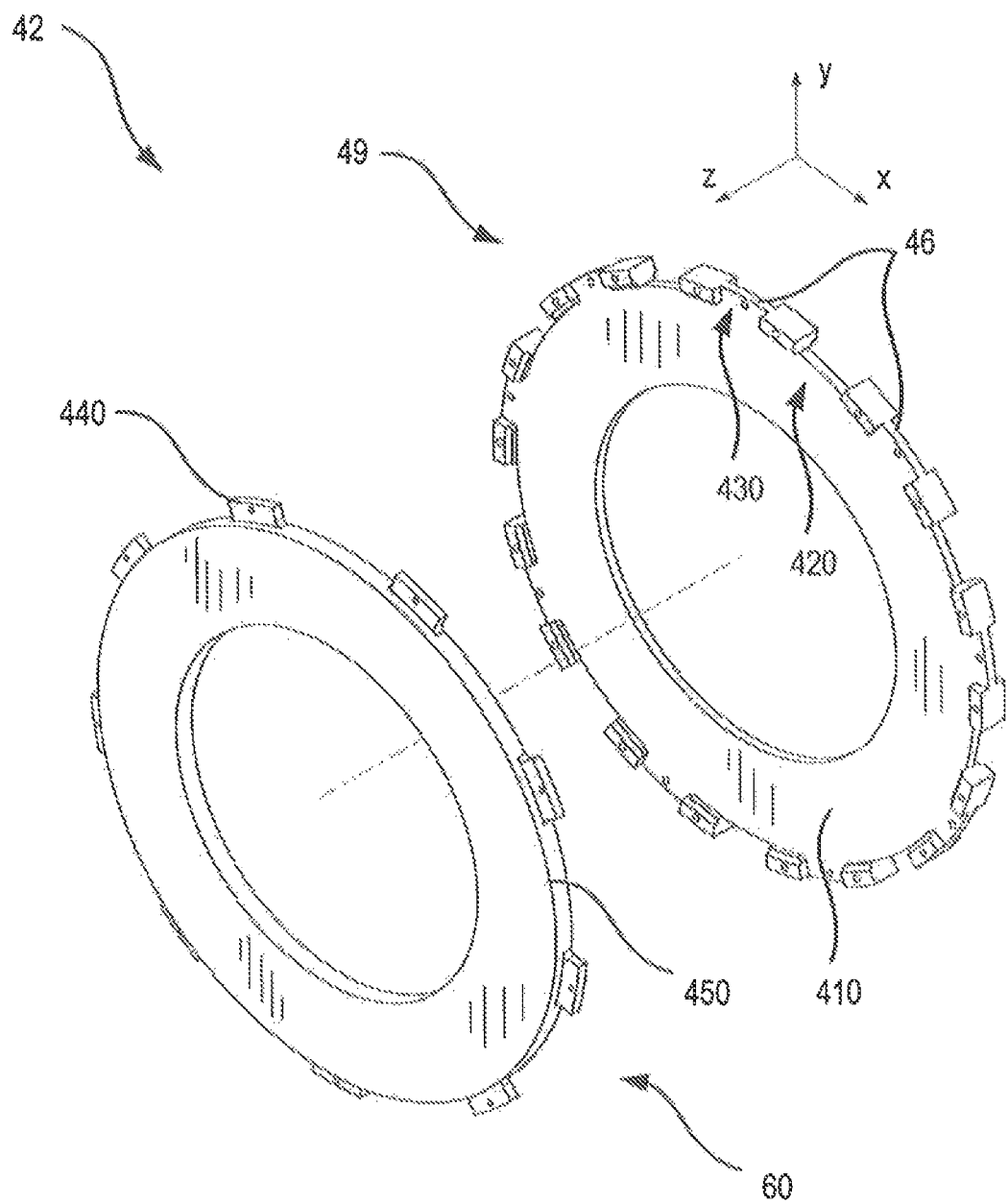
FIG. 4 illustrates, in accordance with various embodiments, an exploded view of a rotor having a keyed wear liner.

Referring to FIG. 4, an exploded view of a rotor 42 is illustrated according to various embodiments. Rotor may comprise rotor core 49, and rotor wear liner 60. Rotor core 49 may comprise rotor spine 410 and rotor lugs 46. Rotor 42 may engage rotor splines 18 in rotor gaps 420 formed between rotor lugs 46. Thus, rotor 42 may be rotatable by virtue of the engagement between rotor lugs 46 and rotor splines 18 of wheel 10. Similar to stator 40, in various embodiments the material of rotor core 49 may be selected for its structural properties. For example, rotor core 49 may comprise silicon carbide or titanium. A material of rotor wear liners 60 may be selected for its frictional properties. For example, rotor wear liners 60 may comprise a carbon composite. Thus, rotor 42 may contain the structural advantages of rotor core 49, and the frictional advantages of rotor wear liners 60. Rotor core 49 may further comprise rotor core key notches 430. Rotor core key notches 430 may be a recessed portion of rotor lugs 46. In the illustrated embodiment, rotor core key notches 430 extend radially all the way through rotor lugs 46, such that rotor lugs 46 have a decreased thickness at rotor core key notches 430. However, in various embodiments, rotor core key notches 430 may only partially extend radially through rotor lugs 46, such that rotor lugs 46 comprise a substantially uniform thickness at an outer surface of rotor lugs 46.

Rotor wear liner 60 may comprise rotor annular ring 450 and rotor keys 440. Rotor keys 440 may be sized and shaped to fit into rotor core key notches 430. Rotor wear liner 60 may comprise any number of rotor keys 440. For example, in the illustrated embodiment, rotor wear liner 60 comprises nine rotor keys 440. However, in various embodiments, rotor wear liner 60 may comprise any number of rotor keys 440, for example, rotor wear liner 60 may comprise three rotor keys 440, or twenty rotor keys 440. In various embodiments, rotor keys 440 and rotor annular ring 450 may comprise a single continuous component. However, in various embodiments, rotor keys 440 may be coupled to rotor annular ring 450. As illustrated, rotor keys 440 may have a thickness in the axial, or "z" direction which is less than a thickness of rotor annular ring 450. However, in various embodiments, the thickness of rotor keys 440, may be substantially the same as or greater than the thickness of rotor annular ring 450.

Figure 5:
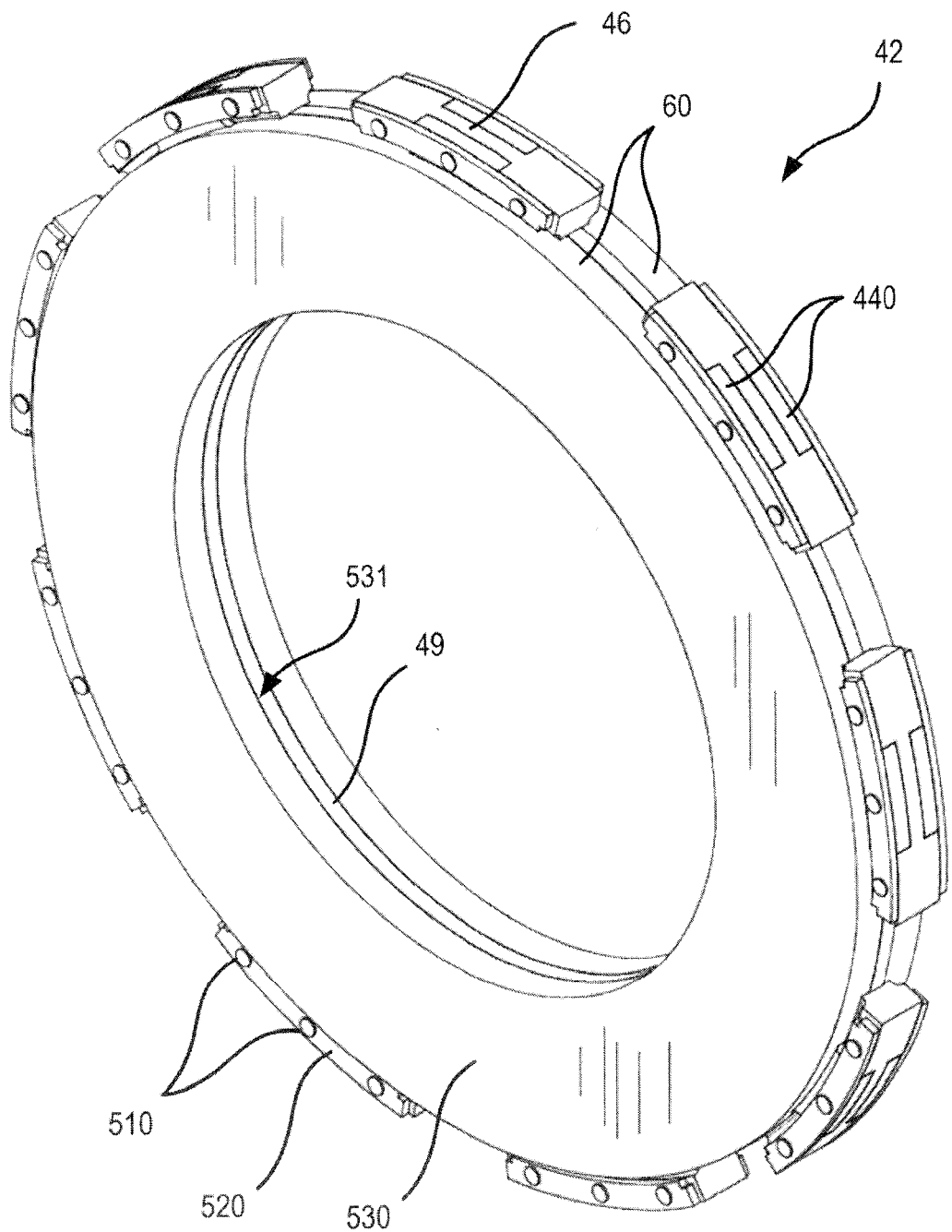
FIG. 5 illustrates, in accordance with various embodiments, an assembled rotor having a keyed wear liner.

Referring to FIG. 5, an assembled rotor 42 is illustrated according to various embodiments. Rotor 42 comprises a rotor wear liner 60 coupled to each side of a rotor core 49. A mating surface 531 of rotor wear liner 60 opposite a rotor wear surface 530 may be bonded to rotor core 49. In various embodiments, rotor wear liners 60 may be coupled to rotor core 49 by a plurality of rivets 510 and cover plates 520. The rivets 510 may extend through cover plates 520, rotor keys 440, and rotor lugs 46. In various embodiments, the rotor keys 440 may not be part of rotor wear surface 530 of the rotor wear liners 60. Thus, regardless of how much the rotor wear liners 60 wear down, rivets 510 will not change the frictional properties of rotor 42. During braking, rotor wear surface 530 may contact stator wear surface 320, which may create the friction necessary to decelerate the aircraft. In various embodiments, rotor wear liners 60 may be bonded to rotor core 49. However, in various embodiments, rotor wear liner 60 may be floating, such that rotor wear liner 60 is positioned adjacent to rotor core 49 without being fastened to each other.

Figure 6:
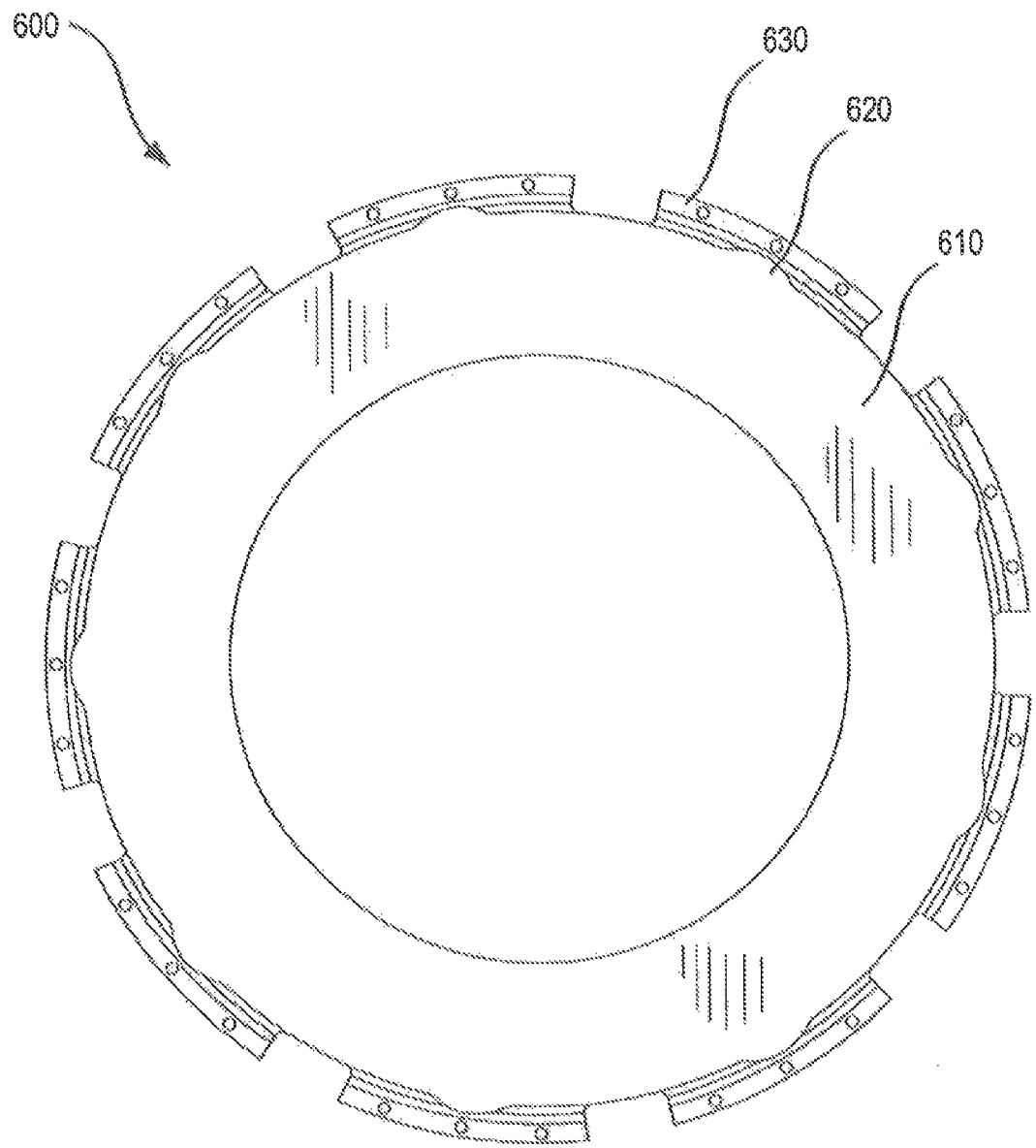
FIG. 6 illustrates, in accordance with various embodiments, a rotor with a keyed wear liner that partially extends into rotor lugs.

Referring to FIG. 6, a rotor 600 is illustrated according to various embodiments. Rotor 600 may comprise a wear liner 610 with a plurality of rotor keys 620. Rotor 600 may further comprise a core with a rotor spine including a plurality of rotor lugs 630. The plurality of rotor keys 620 may be positioned within a plurality of rotor core key notches which partially extend into the plurality of rotor lugs 630. In response to pressure from disk brake system 20, a shear force may be applied to wear liner 610. However, rotor keys 620 may engage rotor lugs 630, preventing wear liner 610 from rotating with respect to the core.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rotor comprising:
a core comprising a spine and a plurality of lugs, wherein the core is a single integral component comprising the spine and the plurality of lugs, wherein a thickness of the plurality of lugs is greater than a thickness of the spine, wherein at least one lug comprises a recessed key notch; and
a wear liner comprising an annular ring having a wear surface and a mating surface, wherein the mating surface is disposed adjacent to the spine, the wear liner further comprising a rotor key, wherein the rotor key is disposed within the recessed key notch.

2. The rotor of claim 1, wherein the wear liner is coupled to the core by at least one of a bond and a rivet.

3. The rotor of claim 1, wherein a thickness of the rotor key is less than a thickness of the annular ring.

4. The rotor of claim 1, wherein the rotor key contacts the at least one lug to oppose a shear force applied to the wear liner.

5. The rotor of claim 1, wherein the core comprises a first material, the first wear liner comprises a second material, and wherein the first material is different than the second material.

6. The rotor of claim 1, further comprising a plurality of gaps located between the plurality of lugs, wherein the plurality of gaps are configured to align with a plurality of rotor splines.

7. The rotor of claim 1, further comprising a plurality of wear liners, wherein a combined thickness of the plurality of wear liners and the spine is greater than the thickness of the plurality of lugs.

8. The rotor of claim 1, wherein the wear liner comprises a first remanufactured wear liner and a second remanufactured wear liner bonded together.

* * * * *